July 31, 1962   J. T. McNANEY   3,047,867
SPECTROELECTRIC DEVICE
Filed April 25, 1961

*INVENTOR.*

*JOSEPH T. McNANEY*

United States Patent Office
3,047,867
Patented July 31, 1962

3,047,867
SPECTROELECTRIC DEVICE
Joseph T. McNaney, 8548 Boulder Drive, La Mesa, Calif.
Filed Apr. 25, 1961, Ser. No. 105,367
9 Claims. (Cl. 346—74)

This invention relates to an improved spectroelectric device capable of being utilized in analyses of radiant energy and in systems for transforming transitory light radiation into data displays and recordings.

In this invention, I utilize an optical fiber having a predetermined index of refraction within a light conducting jacket having an index of refraction lower than the predetermined index of the optical fiber. In an article entitled "Fiber Optics," by Narinder S. Kapany, published in "Scientific American," volume 203, No. 5, November 1960, pages 72 through 81 inclusive, jacketed fibers, their usefulness and techniques for producing them is discussed. As pointed out in this article, jacketed fibers can be drawn down to less than a thousandth of an inch in diameter. The author also emphasized the importance of a jacket of low index intimately joined with the outer surface of an optical fiber in effecting total internal reflection for the conduction of light waves through the fiber. Also included in the discussion is the fact that the reflection of a wave train of light takes place after the electromagnetic field carried by the wave has actually penetrated the jacket of low refractive index beyond the interface of the fiber and the jacket, before turning back into the fiber. It has been estimated that light wave penetrations into the jacket will be a little more than a wavelength from the interface.

In small diameter jacketed fibers, of 0.001" diameter as an example, in lengths of a few tenths of an inch or more, the number of light reflections of a given wave train entering one end of the fiber will be in excess of several hundred reflections before light reaches the other end of the fiber. The number of such reflections will vary, of course, with the angle at which the light wave enters the fiber. With glasses now available for use in the fabrication of optical fibers the critical angle may be as small as 50 degrees and therefore able to trap a cone of light 180 degrees wide. In view of this it is likely to be found that the angles of incidence, and likewise the number of internal reflections possible within a small diameter jacketed fiber, will extend over an extremely wide range. On the other hand, if a small diameter jacketed fiber is jacketed with a material which absorbs light instead of reflecting it as indicated, the light is not likely to travel very far in the fiber before it is totally absorbed by such a jacket.

In my improved spectroelectric device I utilize an optical fiber having a predetermined index of refraction within a jacket of light conducting material having a lower index than that of the fiber, in combination with a layer of photoconductive material disposed upon the outer surface of the jacket which material is an absorber of light waves. One of the most important objectives of my invention is to provide a jacket having a lower index than the fiber which will accomplish both (a) the conduction of light waves from one end of an optical fiber to the opposite end by means of internal reflections and (b) the conduction of light waves through its thickness dimension to a layer of photoconductive material for the entire illumination thereof.

In addition to the objective aforestated, it is an object of this invention to provide spectroelectric device which lends itself to extreme compactness, sensitivity and wide range of control.

It is another object of this invention to provide an improved light radiation to electrical energy converting device which is simple in construction, positive in operation, and trouble-free in continued use.

It is another object of this invention to provide a light radiation to electrical energy converting device for use in transforming transitory light wave information into less temporary forms of visual information.

It is another object of this invention to provide a light radiation to electrical energy converting device for use in apparatus for permitting the electrical energy to be utilized subsequently for record making purposes.

Other objects and advantages will appear hereinafter as a description of the invention proceeds.

The novel features that are considered characteristic of this invention are set forth with particularity in the appended claims. The invention itself, both as to its organization, and method of operation, as well as additional objects and advantages, will best be understood from the following description when read in connection with the accompanying drawing in which:

Figure 1:
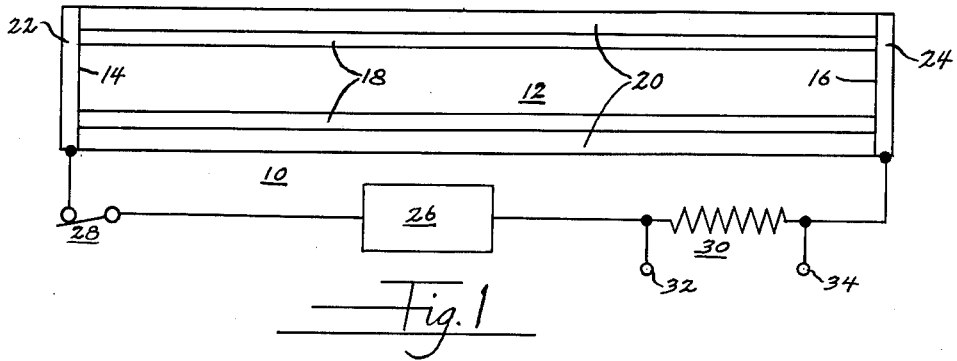
FIGURE 1 is a sectional view of an embodiment of my invention utilizing a unitary device embodying the basic concepts of the invention as a circuitry for analyzing radiant energy.

Referring to the embodiment of FIGURE 1, I have shown therein a unitary device 10 comprising my spectroelectric device which is basically an optical fiber 12 which has a predetermined index of refraction, transverse ends 14 and 16 and a longitudinal dimension which may exceed its cross sectional dimension by several orders of magnitude. The outer longitudinal surface of the fiber 12 has intimately joined therewith a light conducting jacket 18 having a predetermined thickness dimension, and an index of refraction lower than the predetermined index of the fiber 12. A layer 20 of photoconductive material is disposed upon the outer surface of the jacket 18. The layer 20 of photoconductive material may be selected from among certain materials such as selenium, cadmium sulphide silver selenide germanium, and like materials, each of which have properties which in total darkness cause the material to be an excellent resistor to electric current, while in the presence of light illumination, the material becomes conductive.

Primary requirements of the jacket 18 are (a) that it shall have an index of refraction lower than the predetermined index of the fiber 12 and (b) that its thickness dimension shall not prevent the conduction of light waves to any surface area of the layer 20 of photoconductive material which adjoins the jacket 18. The lower index of refraction of the jacket will allow it to function as the necessary reflector of light waves through the fiber, and, given a predetermined thickness dimension the jacket will be made to reflect light waves on a selective basis to therefore provide the necessary function of conducting light waves to the layer of photoconductive material for illumination purposes.

The distance that a light wave penetrates the jacket 18 will be a function of its wavelength, and the source of light radiation directed at an input end 14 of the fiber 12 may be comprised of a wide range of wavelengths. The broad angle over which light waves can be made to enter the end 14 of the fiber 12, in addition to the effect of light spiralling and light scattering that takes place within the fiber, the angles at which light waves will be permitted to enter the jacket 18 from the fiber 12 will extend over an infinitely wide range. Furthermore, the angle of any given light wave will be shifting from one angle to another during its course of travel through the fiber 12.

A light wave of a given wavelength may be reflected by the jacket 18 at one point by reason of a wavelength-to-jacket 18 thickness relationship, but penetrate the jacket thickness at another point due to a slight decrease in jacket thickness. At the input end 14, therefore, the jacket 18 may be of a predetermined thickness which is greater than that at the opposite end 16, giving the jacket 18 a taper, thereby allowing it to reflect or pass light waves as a function of their wavelength throughout its entire length from end 14 to end 16 of the fiber 12.

The variation in thickness of the jacket 18, or taper, may be in the direction of the jacket's circumference, giving the jacket 18 a predetermined thickness on one side which is greater than a predetermined thickness on the opposite side, relating in this manner the thickness of the jacket to a given range of light wavelengths. The spiralling of the light waves will cause light of all wavelengths in a given range to essentially scan the surface of the jacket 18, thereby allowing it to reflect or pass light waves as a function wavelength. If, on the other hand, the light is comprised of but a single wavelength the passage of light would occur only on the side of the jacket 18 where it is found to be thin enough to pass such a wavelength through to the layer 20 of photoconductive material. In this manner the layer 20 would be illuminated from the one end 14 to the other end 16, lowering the electrical resistance of the layer 20 from the one end 14 to the other end 16 accordingly.

In yet another instance, the jacket may have a uniform predetermined thickness throughout its entire area, utilizing the capability of passing light waves below a given wavelength, and also as a function of the angle at which such light waves enters the jacket 18. The shifting from shallow angles to the more steep angles that a given wavelength of light and a given light wave go through during its travels upon entering the one end 14 of the fiber 12, will cause such a light wave to be reflected at shallow angles, but when the angles of entry become steep enough the distance from the interface to the layer 20 will be sufficiently less to enable the light wave to reach the layer 20.

In providing a light radiation to electrical energy converting device of the type shown and described thus far in FIGURE 1, I include an input terminal 22 adjacent the input end 14 of the fiber 12, which is electrically connected to the layer 20 of photo-conductive material, and also an output terminal 24 adjacent the output end 16 of the fiber 12, which is electrically connected to the layer 20 at this latter end of the fiber 12. The input terminal 22 and the output terminal 24 are each comprised of optically transparent electrically conductive material in the form of thin layers deposited on the respective ends 14 and 16 of the device 10. An example of a well known material that may be used for this purpose is a conductive material produced by Pittsburgh Plate Glass Co., under the trademark "Nesa" transparent conductive material, and described in the book entitled "An Introduction to Luminescence of Solids" by Humboldt W. Leverenz, John Wiley & Sons, Inc.

A source of electrical energy from a power supply 26 is used to energize the device 10. The input terminal 22 is electrically connected to the power supply 26 through an On-Off switch 28. The output terminal 24 is electrically connected to the power supply 26 through a circuit element 30, such as a resistor as shown, or, as an inductor, or capacitor, or combinations of such elements. When placed in use for analyzing radiant energy, light radiation entering the input end 14, or the output end 16, or both ends, of the fiber 12 will, as a function of wavelength, intensity, etc., control the illumination of the layer 20 of photoconductive material in accordance with the principles hereinbefore established. In the absence of light radiation the signal output appearing across the circuit element 30 at terminals 32 and 34 will be equal to a zero indication. In the presence of light radiation the output signals will be a function of the light waves conducted through the jacket 18 to the layer 20.

Referring now to the embodiment of FIGURE 2, I again show a unitary device 10 which is basically identical to the device 10 of FIGURE 1. The principal difference will be noted in the use of a layer of phosphor 36 adjacent the output end 16 of the device 10, instead of the transparent conductor layer 24 which is deposited on the outer surface of the phosphor 36. The layer 24, therefore, is electrically connected to the power supply 26 directly, instead of being connected through a circuit element as in FIGURE 1.

The phosphor 36 in this embodiment is of the electroluminescent type which emit light when subject to an electric field. In the present application of this type of phosphor an electric field will be established across the particles contained therein, upon the illumination of the layer 20 of photoconductive material. The electric field will be established between the output terminal, or layer 24, and the extreme end of layer 20 adjacent the phosphor 36, due to the lowering of the electrical resistance of the layer 20 upon the illumination thereof. Light waves radiating from the phosphor will be in proportion to the potential and alternating characteristics of the electric field, and the light waves will be permitted to enter the output end of the fiber 12 and also be viewed through the transparent layer 24. The light waves entering the end 16 of the fiber 12 may be used to illuminate the layer 20 of photo-conductive material once such light waves have been established.

Figure 2:
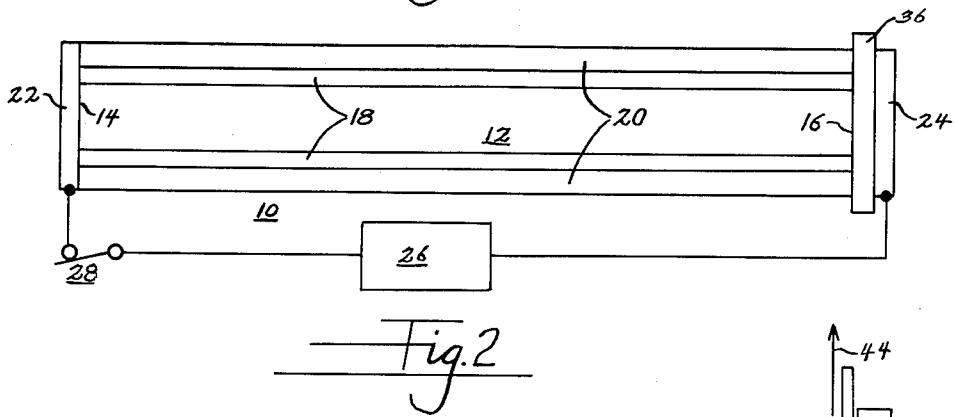
FIGURE 2 is a sectional view of an embodiment of my invention wherein a unitary device is utilized in a system for transforming transitory light radiation into less temporary forms of light radiation.

In view of the description given thus far of the embodiment of FIGURE 2, it should be readily understood that the device 10, when utilized in combination with a layer of electroluminescent phosphor as explained, is capable of transforming transitory light radiation entering the input end of the fiber into a sustained form of light, visible from either end 14 or 16 of the device 10. The secondary form of light from the phosphor 36 may be extinguished by changing the position of the switch 28 to an Off position which of course interrupts the electric field.

The device 10, as a light storage element, lends itself to the fabrication of multi-element arrays. In such arrays large numbers of these devices would be arranged in a side-by-side relationship and secured in such position by means of a plastic binder. The exact size of an array of these elements would be determined by application requirements. In each case, however, the operating principles would remain the same. The input conductor or transparent layer 22 will be made to assume a position adjacent the transverse ends 14 of all of the fibers 12 in the array, and in electrical contact with the layers 20 associated with each fiber 12. The output conductor or transparent layer 24 and the phosphor 36 will be extended to engage the transverse ends 16 of all of the elements 10 in the array.

Figure 3:
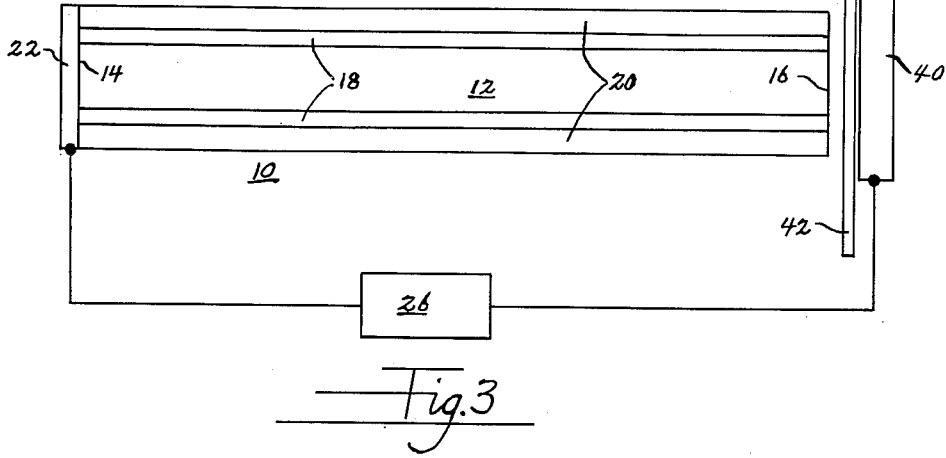
FIGURE 3 is a sectional view of an embodiment of my invention wherein a unitary device is utilized in an apparatus for converting light radiation into electrostatic latent images on a record medium.

Referring now to the embodiment of FIGURE 3, I again show a unitary device 10 which is basically identical to the device 10 of FIGURE 1. However, the device 10 in this embodiment is used to convert light radiation into electrostatic charges on a record medium. There is an input terminal 22 in the form of an optically transparent electrically conductive material, as described in connection with the two previous embodiments, adjacent the transverse end 14, which is electrically connected to the power supply 26. Adjacent the opposite end 16 of the device, in a spaced apart relationship therefrom, there is an electrical conductor or back plate member 40, which is electrically connected to a source of power in the supply 26. Between the input terminal 22 and the back plate member 40, therefore, there is a potential which is preferably D.C. In the spaced apart dimension between the end 16 of the device 10 and member 40, there is provided a record medium 42. The latter may be a sheet of paper, film glass, plastic, or any similar material, capable of presenting a high electrical resistance surface to the end 16 of the device 10.

In the absence of light radiation in the direction of the input end 14 of the fiber 12, the electrical resistance of the layer 20 of photoconductive material will remain high and, therefore, prevent the voltage appearing on the input terminal 22 from appearing at the output end 16 of the device 10. However, when the layer 20 is illuminated as hereinbefore described in conjunction with the previous embodiments of the invention, a voltage will be presented at the opposite end 16 of the device 10, and more particularly at that end of the layer 20. Depending upon the polarity of the voltage presented to the record medium 42 adjacent the end of layer 20, an electrostatic negative or positive charge will be impressed on the surface of the record medium 42. A transformation of light radiation to electrical energy to a latent image on the record medium 42 will have been provided.

The record medium 42 will be moved in the direction of the arrow 44 in the process of depositing latent images on the record medium in response to light radiations entering the input end 14 of the fiber 12. The movement of the record medium 42 will be accomplished by conventional paper or film transport means. The medium 42 may, thereafter, be processed by conventional xerographic development techniques. For example, a development powder may be applied to the electrically charged areas of the medium 42, which areas will attract such powder while the remaining areas of the medium will repel such powder, and at a succeeding step in the process the powder is more permanently fixed to the medium by the application of heat, or by other well known means.

Although only a unitary element 10 is shown in this embodiment, a number of such elements 10 will be utilized in other recording apparatus applications, the number of elements utilized, of course, depending upon application requirements. A single line of elements 10, extended in a crosswise direction to medium movements, will lend the invention to facsimile recording of printed matter or pictorial information. A number of lines of elements 10 supported in parallel and extending crosswise to the direction of medium 42 movements will lend the invention to the recording of symbols, such as letters and numerals, in a line-at-a-time manner.

It should, of course, be understood that many of the other embodiments embracing the general principles and construction hereinbefore set forth, may be utilized and still be within the ambit of the present invention. The particular embodiments of the invention illustrated and described herein are illustrative only, and the invention includes such other modifications and equivalents as may readily appear to those skilled in the arts, and within the scope of the appended claims.

I claim:

1. A radiant energy sensitive variable resistance device comprising: an optical fiber having a predetermined index of refraction, having a longitudinal dimension exceeding its cross sectional dimension and presenting an outer surface generally along the longitudinal dimension; a light conducting jacket having an index of refraction lower than the predetermined index of the fiber and having a predetermined thickness dimension, intimately joined with the outer surface of the fiber, and presenting an outer surface generally along the longitudinal dimension; a layer of photoconductive material disposed upon the outer surface of the jacket; said predetermined thickness dimension of the jacket adapted to control the conduction of light waves through the optical fiber and the conduction of light waves to the photoconductive material.

2. A radiant energy sensitive variable resistance device comprising: an optical fiber having a predetermined index of refraction, having a longitudinal dimension exceeding its cross sectional dimension and presenting an outer surface generally along the longitudinal dimension; a light conducting jacket having an index of refraction lower than the predetermined index of the fiber and having a predetermined thickness dimension, intimately joined with the outer surface of the fiber, and presenting an outer surface generally along the longitudinal dimension; a layer of photoconductive material disposed upon the outer surface of the jacket; said thickness dimension of the jacket adapted to control selectively the illumination of the photoconductive material.

3. A radiant energy sensitive variable resistance device comprising: an optical fiber having a predetermined index of refraction, having a longitudinal dimension exceeding its cross sectional dimension and presenting an outer surface generally along the longitudinal dimension; a light conducting jacket having an index of refraction lower than the predetermined index of the fiber and having predetermined thickness dimensions, intimately joined with the outer surface of the fiber, and presenting an outer surface generally along its longitudinal dimension; a layer of photoconductive material disposed upon the outer surface of the jacket; said thickness dimensions of the jacket adapted to control, selectively, the reflection of light waves to the fiber, and the admittance of light waves to the photoconductive material.

4. A radiant energy sensitive variable resistance device comprising: an optical fiber having a predetermined index of refraction, having a longitudinal dimension exceeding its cross sectional dimension and presenting an outer surface generally along the longitudinal dimension; a light conducting jacket having an index of refraction lower than the predetermined index of the fiber and having predetermined thickness dimensions, intimately joined with the outer surface of the fiber, and presenting an outer surface generally along its longitudinal dimension; photoconductive material disposed upon the outer surface of the jacket; said thickness dimensions of the jacket adapted to control the illumination of the photoconductive material, to thereby provide a resistance change therein, and means for utilizing said resistance change.

5. A light radiation indicating device comprising: an optical fiber having a predetermined index of refraction, having a longitudinal dimension exceeding its cross sectional dimension and presenting outer surfaces generally along the longitudinal dimension and transverse ends of the cross sectional dimension; a light conducting jacket having an index of refraction lower than the predetermined index of the fiber and having predetermined thickness dimensions, intimately joined with the outer surface of the fiber, and presenting an outer surface generally along its longitudinal dimension; photoconductive material disposed upon the outer surface of the jacket, extending to the transverse ends of the fiber; a conductor layer adjacent one of the transverse ends and in electrical contact with the photoconductive material and a conductor layer adjacent the other of the transverse ends and in electrical contact with the photoconductive material adapted to provide the application of an electrical potential thereacross.

6. A light radiation storage device comprising: an optical fiber having a predetermined index of refraction, having a longitudinal dimension exceeding its cross sectional dimension and presenting outer surfaces generally along the longitudinal dimension and transverse ends of the cross sectional dimension; a light conducting jacket having an index of refraction lower than the predetermined index of the fiber and having predetermined thickness dimensions, intimately joined with the outer surface of the fiber, and presenting an outer surface generally along its longitudinal dimension; photoconductive material disposed upon the outer surface of the jacket, extending to the transverse ends of the fiber; a conductor layer adjacent one of the transverse ends and in electrical contact with the photoconductive material; an electroluminescent layer adjacent the other of the transverse ends and in electrical contact with the photoconductive material; and a conductor layer adjacent the electroluminescent layer adapted to provide the application of an electric field thereto.

7. A device for information recording apparatus comprising: an optical fiber having a predetermined index of refraction, having a longitudinal dimension exceeding its cross sectional dimension and presenting outer surfaces generally along the longitudinal dimension and transverse ends of the cross sectional dimension; a light conducting jacket having an index of refraction lower than the predetermined index of the fiber and having predetermined thickness dimensions, intimately joined with the outer surface of the fiber, and presenting an outer surface generally along its longitudinal dimension; photoconductive material disposed upon the outer surface of the jacket, extending to the transverse ends of the fiber; a conductor layer adjacent one of the transverse ends and in electrical contact with the photoconductive material; a conductor member adjacent the other of the transverse ends and spaced apart therefrom and adapted to provide the application of an electrical potential across the spaced apart dimension.

8. A light radiation to electrical energy converter comprising: an optical fiber having a predetermined index of refraction, having a longitudinal dimension exceeding its cross sectional dimension and presenting outer surfaces generally along the longitudinal dimension and transverse ends of the cross sectional dimension; a light conducting jacket having an index of refraction lower than the predetermined index of the fiber and having predetermined thickness dimensions, intimately joined with the outer surface of the fiber, and presenting an outer surface generally along its longitudinal dimension; photoconductive material disposed upon the outer surface of the jacket, extending to the transverse ends of the fiber; said thickness dimension of the jacket adapted to control, selectively, the reflection of light waves to the fiber, and the admittance of light waves to the photoconductive material; record means related operatively to one end of the photoconductive material, and a conductor connected operatively with the opposite end of the photoconductive material; and a source of potential connected between said record means and said conductor whereby said potential is presented across said recorder means upon the admittance of light waves to the photoconductive material.

9. A light radiation sensitive recording apparatus comprising: an optical fiber having a predetermined index of refraction, having a longitudinal dimension exceeding its cross sectional dimension and presenting outer surfaces generally along the longitudinal dimension and transverse ends of the cross sectional dimension; a light conducting jacket having an index of refraction lower than the predetermined index of the fiber and having a predetermined thickness dimension, intimately joined with the outer surface of the fiber, and presenting an outer surface generally along its longitudinal dimension; photoconductive material disposed upon the outer surface of the jacket, extending to the transverse ends of the fiber; said jacket adapted to control the illumination of the photoconductor; a layer of conductive material adjacent one of the transverse ends of the fiber and in electrical contact with the photoconductive material; a conductor member adjacent the other of the transverse ends of the fiber and spaced apart therefrom; a source of potential connected with the layer of conductive material and the conductor member to thereby impress a potential across the photoconductive material and the spaced apart dimension; a record medium within the spaced apart dimension, and means whereby the source of potential will be presented across the spaced apart dimension upon the illumination of the photoconductive material.

No references cited.